United States Patent [19]

Phan et al.

[11] Patent Number: 4,581,430

[45] Date of Patent: Apr. 8, 1986

[54] ACRYLATE AND METHACRYLATE POLYMERS AND PROCESSES FOR PREPARING THEM

[75] Inventors: Xuan T. Phan, Manor Township, Lancaster County; Paul J. Shannon, Millersville, both of Pa.

[73] Assignee: Armstrong World Industries, Inc., Lancaster, Pa.

[21] Appl. No.: 632,652

[22] Filed: Jul. 20, 1984

Related U.S. Application Data

[62] Division of Ser. No. 575,799, Feb. 1, 1984, Pat. No. 4,492,619.

[51] Int. Cl.$^4$ .................. C08F 214/18; C08F 220/26; C08F 220/36
[52] U.S. Cl. .................................... 526/246; 522/174; 526/264; 526/301; 526/304
[58] Field of Search ............... 526/245, 246, 264, 301, 526/304; 204/159.22

[56] References Cited

U.S. PATENT DOCUMENTS

| | | | |
|---|---|---|---|
| 4,287,323 | 9/1981 | Tefertiller et al. | 526/301 |
| 4,495,243 | 1/1985 | Kishi | 526/264 |
| 4,504,628 | 3/1985 | Johnson | 526/301 |

*Primary Examiner*—Harry Wong, Jr.
*Attorney, Agent, or Firm*—Laird F. Miller

[57] ABSTRACT

N-chlorolactams, -amides, and -carbamates are photolyzed in alcoholic solution to provide N-(alpha-alkoxyalkyl)-substituted derivatives. These derivatives are interacted with hydroxylated acrylate or methacrylate esters to yield monomers which may be polymerized in the presence of an appropriate initiator. Many of the monomers are water soluble and are useful to prepare polymeric films having unique properties.

22 Claims, No Drawings

ACRYLATE AND METHACRYLATE POLYMERS AND PROCESSES FOR PREPARING THEM

This application is a division of application Ser. No. 575,799, filed Feb. 1, 1984, now U.S. Pat. No. 4,492,619.

The present invention relates to polymerizable acrylate and methacrylate monomers, and to polymers obtainable therefrom.

BACKGROUND OF THE INVENTION

Monomers comprising acrylate and methacrylate moities have long been known to be amenable to the formation of polymers and copolymers which are useful as surface coverings. Nevertheless, there is continuing interest in developing surface coverings having improved properties, and also in developing monomers which are easily prepared so as to facilitate the production of polymers and copolymers therefrom. Thus, industry has expended substantial time and effort in seeking to develop such new materials.

THE PRIOR ART

The present invention relates to monomers which are deriveable from N-(alpha-alkoxyalkyl)lactams, -amides and -carbamates. Although lactams and amides of this type are known in the art, they have been produced by electrochemical procedures such as those described in U.S. Pat. Nos. 4,138,400; 4,138,408; and 4,140,593 (and the references disclosed therein), which indicate that these compounds have a wide range of uses. For example, they are useful as intermediates in the preparation of pharmaceutical compositions, as antistatic agents, as sex attractants, and the like. However, their utility is severely limited by the manner in which they presently must be produced.

Accordingly, one objective of the present invention is to provide an improved process for the production of N-(alpha-alkoxyalkyl)lactams, -amides and -carbamates.

Another objective of the present invention is to provide monomeric acrylate and methacrylate derivatives which may be used as intermediates in the production of polymers, polymer films, copolymers, and the like.

Yet another objective of the present invention is to provide new and novel polymeric materials which are derivable from the acrylate and methacrylate monomers disclosed herein.

These and other advantages of the present invention will become apparent from the detailed description of preferred embodiments which follow.

SUMMARY OF THE INVENTION

N-chlorolactams, -amides, and -carbamates are photolyzed in alcoholic solution to provide N-(alpha-alkoxyalkyl)-substituted derivatives. These derivatives are interacted with hydroxylated acrylate or methacrylate esters to yield monomers which may be polymerized in the presence of an appropriate initiator. Many of the monomers are water soluble and are useful to prepare polymeric films having unique properties.

DETAILED DESCRIPTION OF PREFERRED EMBODIMENTS

In one embodiment the present invention comprises a process for preparing alkoxy-substituted compounds of the formula

where $A=H$; $B=OR_1$; $R_1=$a primary alkyl group comprising 1-3 carbon atoms; $R_2=$a lower alkyl group comprising 1-6 carbon atoms, an alkoxy group comprising 1-6 carbon atoms, an aryloxy group, or an alicyclic group; and $R_3=H$, a lower alkyl group comprising 1-6 carbon atoms, an alicyclic ring, a substituted aromatic ring, an unsubstituted aromatic ring and, where $R_3$ is other than H, combinations of these moieties, provided that $R_2$ and $R_3$ taken together may be an alkylene chain comprising 1-10 carbon atoms, said process comprising the steps at (1) preparing a solution comprising (a) an alcohol of the formula $R_1OH$ where $R_1$ is as described above, and (b) a compound having the above formula where $A=Cl$, $B=H$, and $R_2$ and $R_3$ are as described above, and (2) photolyzing said solution.

In a second embodiment the present invention comprises a process for preparing monomeric materials of the formula

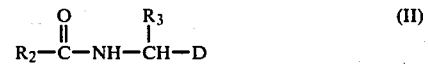

where $R_2=$a lower alkyl group comprising 1-6 carbon atoms, an alkoxy group comprising 1-6 carbon atoms, an aryloxy group, or an alicyclic group; $R_3=H$, a lower alkyl group comprising 1-6 carbon atoms, an alicyclic ring, a substituted aromatic ring, an unsubstituted aromatic ring and, where $R_3$ is other than H, combinations of these moieties;

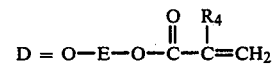

$R_4=H$ or $CH_3$; and $E=$an alkylene chain having 2-10 methylene or lower alkyl-substituted methylene groups, or an unsubstituted or alkyl-substituted alkylene ether, diether or triether having a total of 3-14 carbon atoms, provided that $R_2$ and $R_3$ taken together may be an alkylene chain comprising 1-10 carbon atoms, said process comprising the steps of (1) preparing a solution comprising (a) an alkoxy compound of Formula II where $D=OR_1$, $R_1=$a primary alkyl group comprising 1-3 carbon atoms, and $R_2$ and $R_3$ are as described above, (b) an alcohol of the formula

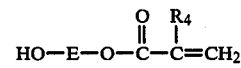

where E and $R_4$ are as described above, (c) an acidic catalyst, and, optionally, (d) an inert organic solvent, and (2) interacting said alkoxy compound and said alcohol.

In a third embodiment the present invention comprises a monomeric material of the formula

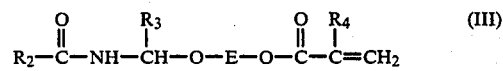

where $R_2=$a lower alkyl group comprising 1-6 carbon atoms, an alkoxy group comprising 1-6 carbon atoms, an aryloxy group, or an alicyclic group; $R_3=H$, a lower alkyl group comprising 1-6 carbon atoms, an alicyclic ring, a substituted aromatic ring, an unsubstituted aromatic ring and, where $R_3$ is other than H, combinations of these moieties; $R_4=H$ or $CH_3$; and E=an alkylene chain having 2-10 methylene or lower alkyl-substituted methylene groups, or an unsubstituted or alkyl-substituted alkylene ether, diether or triether having a total of 3-14 carbom atoms, provided that $R_2$ and $R_3$ taken together may be an alkylene chain comprising 1-10 carbon atoms.

In a fourth embodiment the present invention relates to a process for preparing a polymeric material, said process comprising the steps of (a) preparing a composition comprising (1) at least one monomeric material of the formula

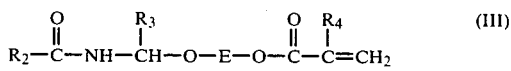

where $R_2=$ a lower alkyl group comprising 1-6 carbon atoms, an alkoxy group comprising 1-6 carbon atoms, an aryloxy group, or an alicyclic group; $R_3=H$, a lower alkyl group comprising 1-6 carbon atoms, an alicyclic ring, a substituted aromatic ring, an unsubstituted aromatic ring and, where $R_3$ is other than H, combinations of these moieties; $R_4=H$ or $CH_3$; and E=an alkylene chain having 2-10 methylene or lower alkylsubstituted methylene groups, or an unsubstituted or alkyl-substituted alkylene ether, diether or triether having a total of 3-14 carbon-atoms, provided that $R_2$ and $R_3$ taken together may be an alkylene chain comprising 1-10 carbon atoms, and (2) a polymerization initiator, and (b) polymerizing said composition.

In a fifth embodiment the present invention relates to a polymeric material obtained by polymerizing a composition comprising a polymerization initiator and at least one compound of the formula

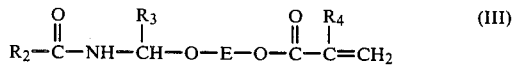

where $R_2=$ a lower alkyl group comprising 1-6 carbon atoms, an alkoxy group comprising 1-6 carbon atoms, an aryloxy group, or an alicyclic group; $R_3=H$, a lower alkyl group comprising 1-6 carbon atoms, an alicyclic ring, a substituted aromatic ring, an unsubstituted aromatic ring and, where $R_3$ is other than H, combinations of these moieties; $R_4=H$ or $CH_3$; and E=an alkylene chain having 2-10 methylene or lower alkyl-substituted methylene groups, or an unsubstituted or alkyl-substituted alkylene ether, diether or triether having a total of 3-14 carbon atoms, provided that $R_2$ and $R_3$ taken together may be an alkylene chain comprising 1-10 carbon atoms.

The N-chlorolactams, -amides, and -carbamates which are useful as starting materials have the formula

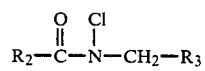

where $R_2$ is a lower alkyl group comprising 1-6 carbon atoms, an alkoxy group comprising 1-6 carbon atoms, an an aryloxy group, or an alicyclic group, and $R_3$ is H, a lower alkyl group comprising 1-6 carbon atoms, an alicyclic ring, or a substituted or an unsubstituted aromatic ring. Substituted aromatic rings may be substituted with substituents such as alkyl, alkoxy, chloride, fluoride, nitrile, and carboalkoxy groups. Where $R_2$ and $R_3$ are other than H, they may also comprise combinations of their respective substituents, and as yet another alternative, $R_2$ and $R_3$ taken together may be an alkylene chain comprising -10 carbon atoms. This will yield a lactam; however, preferably, the lactam ring will comprise five or seven members, and most preferably, seven. When this compound is an amide, $R_2$ will comprise an alkyl or alicyclic group and $R_3$ will be as described above. Finally, when this compound is a carbamate, $R_2$ will be an alkoxy group or an aryloxy group and $R_3$ will be as described above. Methods for the production of N-chloro compounds of this type have long been known in the art.

Regardless of the character of the N-chloro compound, the method of converting it to an N-(alpha-alkoxyalkyl) derivative will be essentially the same; namely, it is placed in an alcoholic solution and photolyzed. The alcohol ($R_1OH$) will be a primary alcohol comprising from 1-3 carbon atoms, but preferably, it will be methanol. Although alkoxy derivatives may also be prepared using other alcohols, they are not preferred because the yields are quite low. For reasons that are not apparent, other alcohols encourage the conversion of the N-chloro compounds to the parent lactam, amide or carbamate. In addition, certain alcohols, such as t-butyl alcohol, also encourage the formation of C-chloro derivatives.

Preferably, the photolysis is carried out at wavelengths of less than 300 nm. In addition, an N-chloro compound concentration of less than 0.1 M is preferred because increased concentration leads to increased conversion of the N-chloro compound to the parent lactam, amide or carbamate. Because the reaction proceeds by an apparent chlorine radical process, the addition of scavengers to neutralize the HCl produced during the course of the photolysis is detrimental. Further, the presence of oxygen is detrimental and it is preferable to purge the photoirradiation apparatus with an inert gas such as nitrogen prior to irradiating the solution. The resulting N-(alpha-alkoxyalkyl) products have the formula

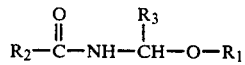

where $R_1$ is a primary alkyl group comprising 1-3 carbon atoms, and $R_2$ and $R_3$ are as defined above. Compounds of this type were previously known; however, except for compounds where $R_3=H$, they were difficult to prepare according to methods then known in the art.

The acrylate and methacrylate monomers are prepared by reacting the above alkoxy compounds, in the presence of an acid catalyst and, optionally, an organic solvent, with a hydroxylated acrylate or methacrylate ester of the formula

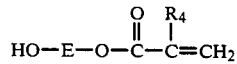

where $R_4=H$ or $CH_3$, and E=an alkylene chain having 2-10 methylene or lower alkyl substituted methylene groups, or an alkylene ether, diether or triether having a total of 3-14 carbon atoms in the alkylene linkages.

Examples of the ethers, diethers, and triethers of E, which may be utilized in practicing the present invention are those which are analogous to ethylene glycol, diethylene glycol, triethylene glycol, tetramethylene glycol, 3,3'-oxybis-1-propanol, 4,4'-oxybis-1-butanol, 1,1'-oxybis-2-propanol, and the like.

Examples of acidic catalysts which will give suitable results are ferric chloride, stannic chloride, acidic ion-exchange resins, para-toluenesulfonic acid, and the like.

The advisability of using an organic solvent will be dependent upon the characteristics of the reactants. Inert solvents such as methylene chloride, acetonitrile, chloroform, tetrahydrofuran, and benzene will often give suitable results, with the former two solvent usually being preferred. It has been noted, however, that it is sometimes preferable to avoid the use of a solvent, and that the reaction may be carried out in an excess of the hydroxylated acrylate/methacrylate ester.

The resulting primary monomers have the formula

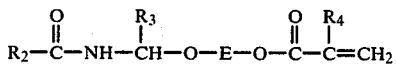

where $R_2$, $R_3$, $R_4$ and E are as previously defined. Many of these monomers are water soluble and aqueous compositions comprising these monomers and suitable initiators may be readily prepared. Films cast from these solutions are particularly useful, especially where hydrophilic functionality is required. Those monomers which are not water soluble may nevertheless be used in a more conventional manner to provide useful polymeric materials.

Of course, the proper selection of an initiator is important to the product which is obtained. Both photoinitiators and thermal radical initiators may be used to induce polymerization, preferred examples being 2,2-dimethoxy-2-phenylacetophenone (sold as Irgacure 651 by Ciba-Geigy) and azo-bis-(isobutylnitrile) (commonly referred to as AIBN), respectively. The selection of an initiator is within the skill of an ordinary artisan and will be matter of choice depending on the characteristics which are desired in the polymer.

From the foregoing it will be apparent that the primary monomers of the present invention may be solution polymerized in a solvent such as benzene, whereby a radical initiator such as AIBN would be used. Alternatively, the monomers may be formed as a film and subjected to photopolymerizing radiation. In the latter instance, of course, a photoinitiator would be required. Homopolymers may be produced in this manner; however, copolymers may also be produced by including a second primary monomer of the present invention, by providing a secondary monomeric material having ethylenic unsaturation, or by including a prepolymeric material having ethylenic unsaturation. An example of the latter would be an acrylated urethane prepolymer or comparable prepolymer, whereas examples of ethylenically unsaturated secondary monomeric materials, which may be used alone or in combination, would include ethyl acrylate, propyl acrylate, isopropyl acrylate, butyl acrylate, t-butyl acrylate, 2-ethylhexyl acrylate, isodecyl acrylate, dicyclopentenyl acrylate, 2-phenoxyethyl acrylate, N,N-dimethylaminoethyl acrylate, ethyl methacrylate, propyl methacrylate, isopropyl methacrylate, butyl methacrylate, t-butyl metharylate, 2-ethylhexyl methacrylate, isodecyl methacrylate, dicyclopentenyl methacrylate, 2-phenoxyethyl methacrylate, N,N-dimethylaminoethyl methacrylate, acrylic and methacrylic acid esters of lactic acid and stearic acid, hexanediol diacrylate, neopentyldiol diacrylate, ethylene glycol diacrylate, propylene glycol diacrylate, diethylene glycol diacrylate, 1,6-hexanediol diacrylate, ethylene glycol dimethyacrylate, propylene glycol dimethacrylate, butylene glycol dimethacrylate, trimethylolpropane triacrylate, trimethylolpropane trimethacrylate, pentaerythritol di, tri, and tetra-acrylate and mixtures thereof, pentaerythritol di-, tri-, and tetramethacrylate and mixtures thereof, acrylated or methacrylated fatty acids such as linseed oil or soybean oil, acrylamide, methacrylamide, N-methyl acrylamide, N-ethyl acrylamide, N-propyl acrylamide and the like, N-methyl methacrylamide, N-ethyl methacrylamide, N-propyl methacrylamide and the like, N,N-dimethyl acrylamide, N,N-diethyl acrylamide and the like, N,N-dimethyl methacrylamide, N,N-diethyl methacrylamide and the like, acrylic acid, methacrylic acid, 2-hydroxyethyl acrylate, 2-hydroxyethyl methacrylate, glycidyl acrylate, glycidyl methacrylate, allyl acrylate, allyl methacrylate, N-isobutoxy acrylamide, N-methylol acrylamide, vinyl acetate, N-vinylpyrrolidone, N-vinylimidazole, vinyl pyridine, N-vinyl-piperidone, and others.

A wide variety of homopolymers and copolymers are attainable in this fashion, and the components which are copolymerized with the monomers of the present invention will be limited only by the artisan's imagination. For many applications, an artisan may find it preferable to produce comonomers because films produced as copolymers from secondary oligomers, reactive diluents, and prepolymers may tend to show somewhat better performance characteristics.

The present invention will be more clearly understood by reference to the following examples which are intended by way of illustration and not limitation.

EXAMPLES

Example 1

This example will illustrate a convenient prior art method for the preparation of the N-chloro starting material. The parent amide, lactam, or carbamate (0.02 mol) in 25 mL of methanol was treated with 0.03 mol of t-butyl hypochlorite and stirred under nitrogen for 30 minutes. Upon removal of the solvent under reduced pressure, colorless or slightly yellow liquids were obtained and were purified by vacuum distillation. Representative compounds are as follows, were A=Cl:

$$R_2-\overset{O}{\underset{\|}{C}}-\overset{A}{\underset{|}{N}}-CH_2-R_3$$

| Compound | $R_2$ | $R_3$ | Boiling Point (°C.) | |
|---|---|---|---|---|
| 1a | n-C$_4$H$_9$ | H | 50-53 | (2.2 mm) |
| 1b | n-C$_5$H$_{11}$ | CH$_3$ | 54 | (0.08 mm) |
| 1c | CH$_3$ | (CH$_3$)$_2$CH | 107-110 | (15 mm) |
| 1d | CH$_3$ | n-C$_5$H$_{11}$ | 57-60 | (0.02 mm) |
| 1e | CH$_3$ | C$_6$H$_5$ | 100-102 | (0.9 mm) |
| 1f | —(CH$_2$)$_2$— | | ND | |
| 1g | —(CH$_2$)$_3$— | | ND | |
| 1h | —(CH$_2$)$_4$— | | ND | |
| 1i | CH$_3$O | n-C$_5$H$_{11}$ | 65-70 | (0.25 mm) |
| 1j | C$_2$H$_5$O | n-C$_4$H$_9$ | 74-80 | (0.3 mm) |
| 1k | n-C$_4$H$_9$O | H | 55-61 | (0.5 mm) |
| 1m | n-C$_4$H$_9$O | n-C$_3$H$_7$ | 75-80 | (0.3 mm) |
| 1n | n-C$_4$H$_9$O | n-C$_5$H$_{11}$ | 94-100 | (0.4 mm) |

-continued $$R_2-\underset{\underset{O}{\|}}{C}-\underset{\underset{A}{|}}{N}-CH_2-R_3$$

| Compound | R$_2$ | R$_3$ | Boiling Point (°C.) |
|---|---|---|---|
| 1o | | —(CH$_2$)$_{10}$— | 104–112 (0.25 mm) |
| 1p | CH$_3$ | p-ClC$_6$H$_4$ | 105–110 (0.1 mm) |

ND — Not Distilled

Example 2

This example will illustrate a general procedure which may be followed to produce N-(alpha-alkoxyalkyl) amides, lactams, and carbamates from N-chloro precursors. For convenience, only methanol is used as the solvent in this illustration. A solution of N-chloro precursor (25 mmol) in 330 mL of methanol was placed in a water-cooled quartz immersion well fitted with a Vycor filter. The apparatus was purged with nitrogen for 15 minutes, and the solution was irradiated for 15 minutes with a Hanovia medium-pressure 450-watt mercury lamp. The solution was made slightly basic (pH 8-9) by the addition of 25 mL of 1N sodium hydroxide and the volume was reduced to 35 mL. The concentrated solution was extracted 5 times with 40-mL aliquots of dichloromethane, after which the combined extracts were dried over magnesium sulfate and concentrated to give an oil. The oil was purified by flash chromotography on silica gel using petroleum ether-ethyl acetate-methanol eluant (3:1:0.1) according to the method of Stille et al., J. Org. Chem., 43, 2923 (1978). The following representative N-(alpha-methoxyalkyl) derivatives were obtained:

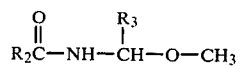

$$R_2\underset{\underset{O}{\|}}{C}-NH-\underset{\underset{R_3}{|}}{CH}-O-CH_3$$

| Compound | R$_2$ | R$_3$ | Yield (%) by GC |
|---|---|---|---|
| 2a | n-C$_4$H$_9$ | H | 84 |
| 2b | n-C$_5$H$_{11}$ | CH$_3$ | 80 |
| 2c | CH$_3$ | (CH$_3$)$_2$CH | 85 |
| 2d | CH$_3$ | n-C$_5$H$_{11}$ | 81 |
| 2e | CH$_3$ | C$_6$H$_5$ | 37 |
| 2f | —(CH$_2$)$_2$— | | (64) |
| 2g | —(CH$_2$)$_3$— | | (69) |
| 2h | —(CH$_2$)$_4$— | | 77 |
| 2i | CH$_3$O | n-C$_5$H$_{11}$ | 72 |
| 2j | C$_2$H$_5$O | n-C$_4$H$_9$ | 52 |
| 2k | n-C$_4$H$_9$O | H | 47 |
| 2m | n-C$_4$H$_9$O | n-C$_3$H$_7$ | 55 |
| 2n | n-C$_4$H$_9$O | n-C$_5$H$_{11}$ | 59 |
| 2o | —(CH$_2$)$_{10}$— | | 53 |
| 2p | CH$_3$ | p-ClC$_6$H$_4$ | (26) |
| 2q | CH$_3$ | H | 68* |

( ) = yield by isolation
* = prepared essentially according to the method of Brace et al., J. Org. Chem., 26, 5176 (1961).

The major impurity detected in each case was the parent amide, lactam or carbamate (where the OCH$_3$ on the alpha carbon was replaced by H).

Example 3

This example will illustrate the results which are obtained when various alcohols are used as the medium during the irradiation of an N-chloro precursor essentially as described in Example 2. For illustration, compound 1a was used with the object of producing a product of the formula:

$$n-C_4H_9-\underset{\underset{O}{\|}}{C}-NH-CH_2-O-R_1$$

| Compound | Solvent | R$_1$ | Yield (%) by GC |
|---|---|---|---|
| 3A | CH$_3$OH | CH$_3$ | 84 |
| 3B | C$_2$H$_5$OH | C$_2$H$_5$ | 44 |
| 3C | (CH$_3$)$_2$CHOH | (CH$_3$)$_2$CH | — |
| 3D | (CH$_3$COH | (CH$_3$)$_3$C | 14 |
| 3E | CH$_3$(CH$_2$)$_2$OH | C$_3$H$_7$ | 10 |

These results indicate that methanol is the preferred solvent, and that a secondary alcohol such as isopropyl alcohol fails to react to give an alkoxy substituted product.

Example 4

This example will illustrate the effect of increased concentration when N-chloro precursors are irradiated as described in Example 2. Compound 1i is used as the starting material in this illustration.

| Concentration in Methanol (M) | Yield (%) by GC | |
|---|---|---|
| | 2i | Parent Carbamate* |
| 0.05 | 80 | 20 |
| 0.08 | 75 | 24 |
| 0.1 | 62 | 33 |
| 0.15 | 55 | 38 |
| 0.2 | 41 | 43 |
| 0.3 | 22 | 63 |
| 0.5 | 2 | 85 |

*Methyl N—hexylcarbamate

These results clearly indicate that it is preferable to carry out the photolysis at an N-chloro precursor concentration of 0.1M or less.

Example 5

This example will illustrate the effect of various additives upon product yields when a representative precursor is irradiated essentially as described in Example 2. Compound 1a is used as the starting material and methanol is used as the solvent.

| Additive | Additive Concentration (M) | Product Yield (%) by GC | |
|---|---|---|---|
| | | 2a | Parent Amide* |
| None | — | 84 | 16 |
| Potassium acetate | 0.15 | — | 62 |
| 2,4,6-Trimethylpyridine | 0.15 | — | 52 |
| HCl | 0.15 | 0 | 100 |
| H$_2$SO$_4$ | 1.0 | 37 | 60 |
| Acetic acid | 1.0 | 63 | 35 |
| Trifluoroacetic acid | 1.0 | 55 | 40 |
| Oxygen | ** | 28 | 57 |

*N—methylpentanamide
**Oxygen was bubbled through the solution for 15 minutes prior to, and also during, irradiation.

Example 6

This example will illustrate the effect of light intensity and light wavelength upon product yield for products of the type described in Example 2. Compound 1a was irradiated in methanol as described in Example 2, except that various glass filters were used between the sample and the radiation source. The results obtained were as follows:

| Glass Filter | Transmitted Wavelength (mm) | Yield of Product 2a (%) |
|---|---|---|
| Vycor | >210 | 84 |
| Pyrex | >280 | 61 |
| Uranium | >330 | 32 |

These results illustrate that yields decrease with increased wavelength.

High intensity light is also important in obtaining good yields. For example, if the photolysis is carried out in a Rayonet reactor (Model RPR-100) fitted with RPR-2537 or RPR-3000 angstrom lamps, the use of an increased number of lamps leads to increased yields, as illustrated by the following table:

| Wavelength (nm) | No. of Lamps | Yield of Product 2a (%) |
|---|---|---|
| 254 | 1 | 72 |
|  | 3 | 78 |
|  | 6 | 84 |
| 300 | 1 | 47 |
|  | 3 | 63 |
|  | 6 | 61 |

Example 7

This example will illustrate the preparation of acrylate and methacrylate primary monomers from alkoxy compounds of the type disclosed in Example 2 and a hydroxylated acrylate or methacrylate ester having the formula

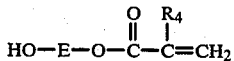

wherein E and $R_4$ are as previously described.

The alkoxy compound (5 grams), ester (35 mL) and para-toluenesulfonic acid catalyst (0.02 gram) were stirred at room temperature for 4.5 hours under nitrogen. A 75-mL quantity of methylene chloride was added and the solution was extracted with 15 mL of concentrated sodium bicarbonate solution, and then with 15 mL of sodium chloride solution. The organic solution was then dried over magnesium sulfate and concentrated. Excess ester was removed by distillation under reduced pressure and the residue was purified by flash chromotography on silica gel using ether-ethyl acetate (1:2).

As an alternative method, equimolar amounts of alkoxy compound (5 grams) and ester were stirred with stannic chloride catalyst (10 drops), methyl hydroquinone (0.01 gram), and a solvent (methylene chloride, 90 mL) for three hours. The solution was then extracted twice with 20-mL aliquots of sodium chloride solution, dried over magnesium sulfate and concentrated. Purification (if necessary) was performed as described above. Using these procedures, the following primary monomers were prepared:

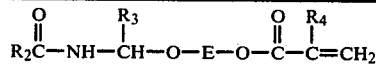

| Compound | Starting Alkoxide | $R_2$ | $R_3$ | $R_4$ | E | Yield (%) by Isolation |
|---|---|---|---|---|---|---|
| 7A | 2f | $-(CH_2)_2-$ | | H | $(CH_2)_2$ | 50 |
| 7B | 2h | $-(CH_2)_4-$ | | H | $(CH_2)_2$ | 68 |
| 7C | 2h | $-(CH_2)_4-$ | | H | $(CH_2)_6$ | 57 |
| 7D | 2h | $-(CH_2)_4-$ | | $CH_3$ | $(CH_2)_2O(CH_2)_2$ | 25 |
| 7E | 2o | $-(CH_2)_{10}-$ | | H | $(CH_2)_2$ | 16 |
| 7F | 2o | $-(CH_2)_{10}-$ | | $CH_3$ | $(CH_2)_6$ | 42 |
| 7G | 2b | $C_5H_{11}$ | $CH_3$ | H | $(CH_2)_6$ | 63 |
| 7H | 2q | $CH_3$ | H | H | $(CH_2)_2$ | 67 |

Example 8

This example will illustrate a solution polymerization process for preparing polymers from primary monomers of the type described in Example 7. A solution was prepared comprising a monomer of the present invention, optionally a comonomer, AIBN initiator (1% by weight), and benzene solvent. The solution was heated for the indicated period of time at 60° C. Upon cooling, the polymer precipitated and was dried under vacuum.

| Polymer | Monomer (weight) | Comonomer (weight) | Time | Yield | Tg | DSC Endotherms |
|---|---|---|---|---|---|---|
| 8A | 7A (4.2 g) | — | 3 days | 3.3 g | 2° C. | None |
| 8B | 7B (8.0 g) | — | 3 hrs. | 5 g | 5° C. | 98°; 250° C. |
| 8C | 7B (0.2 g) | butyl acrylate (0.3 g) | 1.5 hrs. | 0.35 g | −13° C. | None |
| 8D | 7C (1.2 g) | — | 3 days | 1.1 g | 3° C. | 67°; 225°; 240° C. |
| 8E | 7G (1.9 g) | — | 15 hrs. | 1.7 g | −20° C. | 245° C. |

Example 9

This example will illustrate a photopolymerization process for the preparation of polymer films according to the present invention. Monomer 7B was prepared by stirring a mixture of 2-hydroxyethylacrylate (1.13 g), lactam 2h (0.35 g), and stannic chloride (0.05 g) for 1.5 hrs. at room temperature under reduced pressure (0.1 mm Hg). To the resulting mixture was added Irgacure 651 photoinitiator (0.015 g), after which the material was formed as a film between mylar sheets. The film was irradiated with a Hanovia 450-watt, medium-pressure mercury lamp for 3 minutes to provide a polymer film having a Tg of −5° C. DSC examination indicated two endothermal transitions at 102° and 152° C.

Example 10

This example will illustrate a UV-curable waterborne coating composition in combination with a water-soluble acrylate-amide primary monomer of the present invention. An aqueous composition was prepared containing the following materials:

| Component | Weight (g) |
| --- | --- |
| Monomer 7H | 1.8 |
| Polyethylene glycol diacrylate (Sartomer SR-259) | 1.8 |
| Water | 10.8 |
| N—Methylpyrrolidone | 1.0 |
| Irgacure 651 photoinitiator | 0.05 |

The composition was coated on a glass plate using a 6-mil Bird Blade and the plate was dried at 60° C. The dried plate was then cooled and irradiated for 2 minutes with a 450-W medium pressure mercury lamp. The resulting film was clear and hard.

The present invention is not limited to the descriptions and illustrations set forth above, but encompasses all modifications envisaged by the following claims.

What is claimed is:

1. A process for preparing a polymeric material, said process comprising the steps of
   A. preparing a composition comprising
      (1) at least one primary monomeric material of the formula

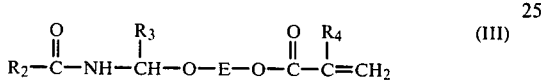

where
      $R_2$ = a lower alkyl group comprising 1–6 carbon atoms, an alkoxy group comprising 1–6 carbon atoms, an aryloxy group, or an alicyclic group,
      $R_3$ = H, a lower alkyl group comprising 1–6 carbon atoms, an alicyclic ring, a substituted aromatic ring, an unsubstituted aromatic ring and, where $R_3$ is other than H, combinations of these moieties,
      $R_4$ = H or $CH_3$, and
      E = an alkylene chain having 2–10 methylene or lower alkyl-substituted methylene groups, or an unsubstituted or alkyl-substituted alkylene ether, diether or triether having a total of 3–14 carbons atoms,
      provided that $R_2$ and $R_3$ when taken together may be an alkylene chain comprising 1–10 carbon atoms, and
      (2) a polymerization initiator, and
   B. polymerizing the polymerizable components.

2. The process as set forth in claim 1 hereof wherein the monomer of Formula III is a lactam.

3. The process as set forth in claim 2 hereof wherein the lactam ring comprises 5 members.

4. The process as set forth in claim 2 hereof wherein the lactam ring comprises 7 members.

5. The process as set forth in claim 1 hereof wherein the monomer of Formula III is an amide.

6. The process as set forth in claim 1 hereof wherein the monomer of Formula III is a carbamate.

7. The process as set forth in claim 1 hereof wherein $R_3$ comprises an aromatic ring which is substituted with substituents selected from the group consisting of alkyl, alkoxy, chloride, fluoride, nitrile, and carboalkoxy.

8. The process as set forth in claim 1 hereof wherein the monomer of Formula III is water soluble.

9. The process as set forth in claim 1 hereof wherein the composition which is polymerized comprises at least one ethylenically unsaturated secondary monomeric material.

10. The process as set forth in claim 1 hereof wherein said polymerization step is a solution polymerization step.

11. The process as set forth in claim 1 hereof wherein said polymerization step is a photopolymerization step.

12. A polymeric material obtained by polymerizing, in the presence of a polymerization initiator, a composition comprising at least one primary monomeric material of the formula

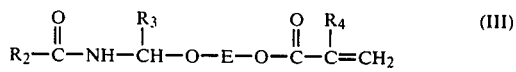

where
   $R_2$ = a lower alkyl group comprising 1–6 carbon atoms, an alkoxy group comprising 1–6 carbon atoms, an aryloxy group, or an alicyclic group,
   $R_3$ = H, a lower alkyl group comprising 1–6 carbon atoms, an alicyclic ring, a substituted aromatic ring, an unsubstituted aromatic ring and, where $R_3$ is other than H, combinations of these moieties,
   $R_4$ = H or $CH_3$, and
   E = an alkylene chain having 2–10 methylene or lower alkyl-substituted methylene groups, or an unsubstituted or alkyl-substituted alkylene ether, diether or triether having a total of 3–14 carbon atoms,
provided that $R_2$ and $R_3$ when taken together may be an alkylene chain comprising 1–10 carbon atoms.

13. The polymeric material as set forth in claim 12 hereof wherein the monomer of Formula III is a lactam.

14. The polymeric material as set forth in claim 12 hereof wherein the lactam ring comprises 5 members.

15. The polymeric material as set forth in claim 13 hereof wherein the lactam ring comprises 7 members.

16. The polymeric material as set forth in claim 12 hereof wherein the monomer of Formula III is an amide.

17. The polymeric material as set forth in claim 12 hereof wherein the monomer of Formula III is a carbamate.

18. The polymeric material as set forth in claim 12 hereof wherein $R_3$ comprises an aromatic ring which is substituted with substituents selected from the group consisting of alkyl, alkoxy, chloride, fluoride, nitrile, and carboalkoxy.

19. The polymeric material as set forth in claim 12 hereof wherein the monomer of Formula III is water soluble.

20. The polymeric material as set forth in claim 12 hereof wherein the composition which is polymerized comprises at least one ethylenically unsaturated secondary monomeric material.

21. The polymeric material as set forth in claim 12 hereof wherein said polymerization step is a solution polymerization step.

22. The polymeric material as set forth in claim 12 hereof wherein said polymerization step is a photopolymerization step.

* * * * *